United States Patent [19]
Tarzian

[11] 3,747,172
[45] July 24, 1973

[54] HOSE CLAMP
[76] Inventor: Harry J. Tarzian, R.D. 2, Box 245-D, Blairsville, Pa. 15717
[22] Filed: Feb. 3, 1972
[21] Appl. No.: 223,137

[52] U.S. Cl. .............................. 24/282, 24/20 EE
[51] Int. Cl. .......................................... B65d 63/08
[58] Field of Search ................... 24/279, 280, 281, 24/282, 283, 284, 20 EE, 23 EE

[56] References Cited
UNITED STATES PATENTS

| | | | |
|---|---|---|---|
| 2,318,946 | 5/1943 | Kass | 24/282 |
| 1,999,683 | 4/1935 | Borresen | 24/281 |
| 2,035,351 | 3/1936 | Taylor | 24/20 E E |
| 1,986,748 | 1/1935 | Pritchard | 24/281 |
| 2,990,599 | 7/1961 | Gustavsson | 24/279 |

Primary Examiner—James T. McCall
Assistant Examiner—Kenneth J. Dorner
Attorney—Melvin A. Crosby

[57] ABSTRACT

A hose clamp in which the band portion is made up in segments which can be interlocked to form the complete band. The segments have cooperating elements of a disengageable hook type connection means on the adjacent ends thereof and the terminal elements are formed with cooperating elements of an adjustable connector for drawing the band up about a hose to be clamped thereby.

9 Claims, 12 Drawing Figures

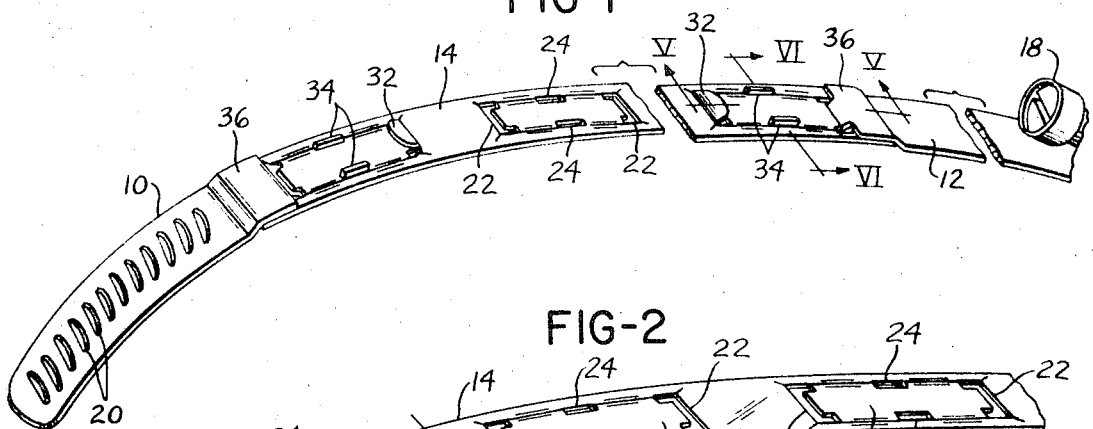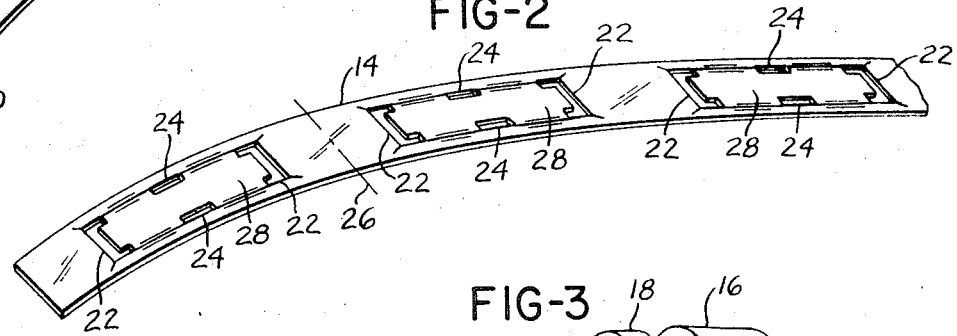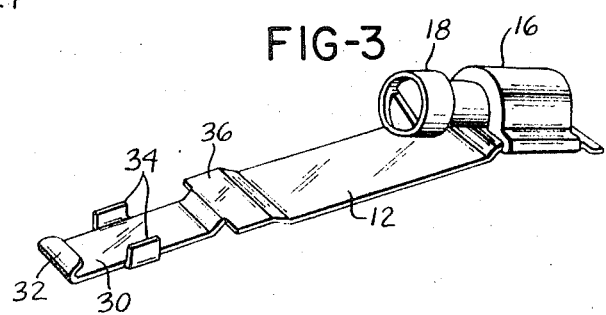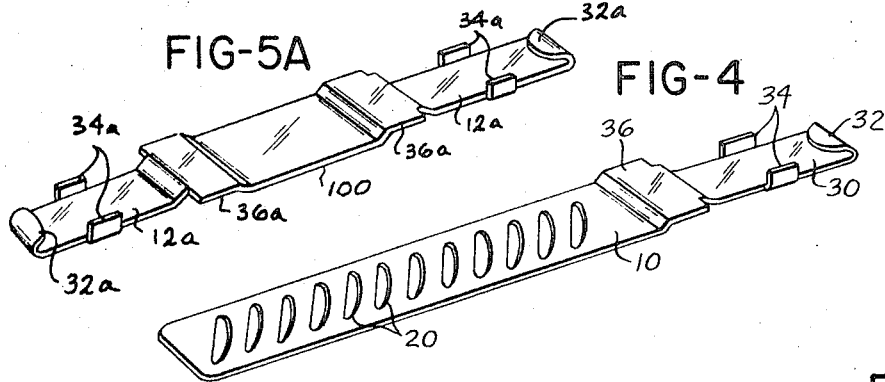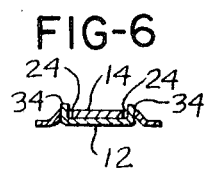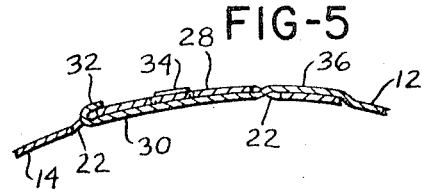

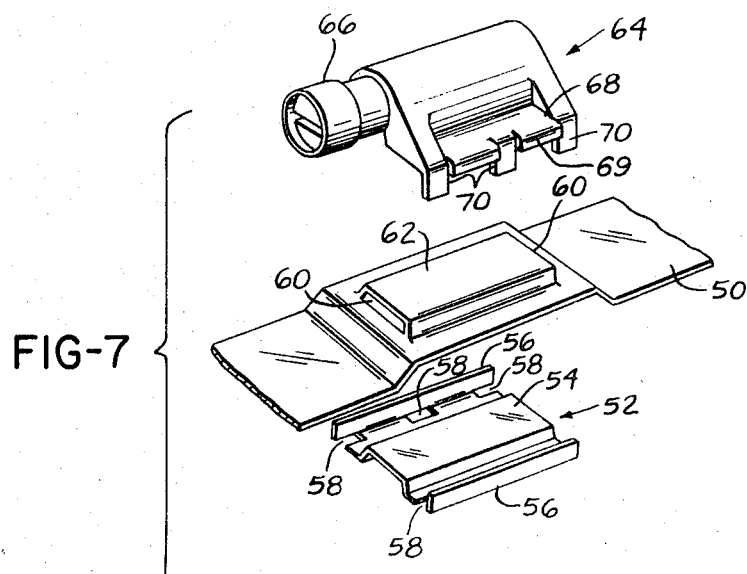
FIG-7
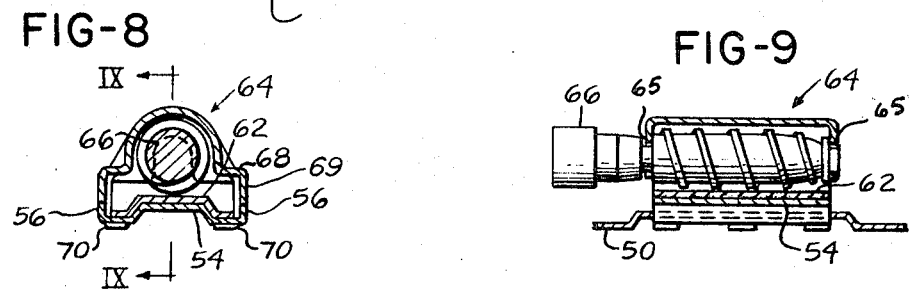
FIG-8
FIG-9
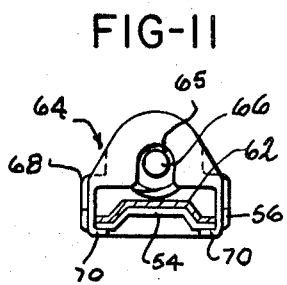
FIG-11
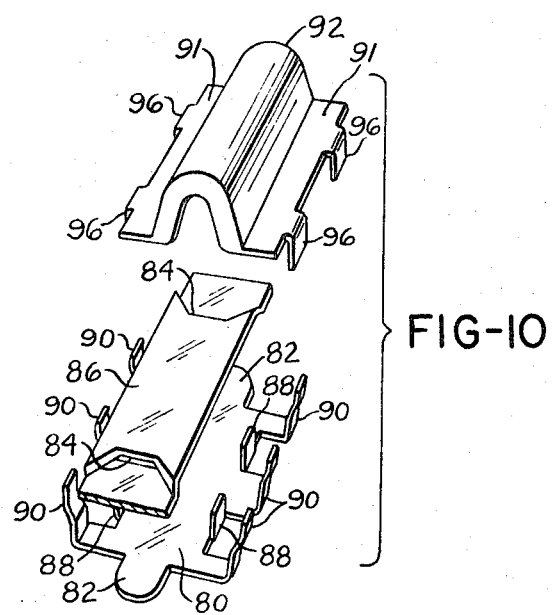
FIG-10

3,747,172

HOSE CLAMP

The present invention relates to hose clamps and is particularly concerned with a hose clamp which is assembled from segments so that it can be made up to any desired size.

Hose clamps, at the present time, are manufactured to certain specific sizes and this means that the inventory of hose clamps is increased for the manufacturer and for the seller and user. This large inventory represents a substantial expense at every point, and the sizes to which the hose clamps are made is often a compromise to avoid excessive inventory.

With the foregoing in mind, a primary objective of the present invention is the provision of a hose clamp construction in which a relative few simple basic parts can be manufactured and from which a hose clamp of any desired size can readily be fabricated.

Another object of the present invention is the provision of a hose clamp structure in which the connecting means at the free ends of the hose clamp band are fabricated for greater strength and ease of assembly than has heretofore been the case.

These and other objects and advantages of the present invention will become more apparent upon reference to the following detailed specification taken in connection with the accompanying drawings in which:

FIG. 1 is a perspective view showing a clamp according to the present invention prior to clamping about a hose;

FIG. 2 is a view showing the central segment of the clamp;

FIG. 3 is a perspective view showing the terminal segment of a clamp which carries the screw part of the connection means at one end of the band;

FIG. 4 is a perspective view showing the terminal segment at the other end of the band;

FIG. 5 is a sectional view indicated by line V—V on FIG. 1 showing more in detail the manner in which the adjacent ends of segments of the band are interconnected;

FIG. 5A is a perspective view showing a connector element;

FIG. 6 is a sectional view indicated by line VI—VI on FIG. 1;

FIG. 7 is a perspective view showing an improved arrangement for connecting the screw portion of the band connector to the pertaining end of the band;

FIG. 8 is a transverse cross section through the arrangement of FIG. 7 after assembly thereof with the band;

FIG. 9 is a longitudinal section indicated by line IX—IX on FIG. 8;

FIG. 10 is a perspective view showing a modified construction of the screw portion of the connector; and FIG. 11 is an end view of the modification of FIG. 7.

BRIEF SUMMARY OF THE INVENTION

According to the present invention, a hose clamp is provided consisting of a screw device on one end of the band and threaded means on the other end of the band for cooperation with the screw to permit the band to be clamped about a hose and drawn up tight thereon the band itself is segmented so as to have two terminal portions and an intermediate portion.

Each of the terminal portions on the end adjacent the intermediate portion has a tongue with a hook on the end and the intermediate portion is provided with a series of spaced pairs of transverse slots with the slots of each pair spaced in the direction of the length of the band so that by cutting off the intermediate portion of the band to the proper length between adjacent pairs of the transverse slots the band can be made to any desired length.

A complete stock of bands thus comprises a stock of the terminal portions and one or more lengths of the intermediate portion which can be cut off to the desired length of the particular band required.

DETAILED DESCRIPTION OF THE INVENTION

Referring to the drawings somewhat more in detail; FIG. 1 shows a hose clamp in opened up condition and which will be seen to be segmented and comprise terminal segments 10 and 12 and an intermediate segment 14. The free end of terminal portion 2 carries a frame 16 in which a screw 18 is mounted and which screw is adapted for cooperation with inclined slits 20 formed in terminal portion 10 commencing from the free end thereof.

When the free end of portion of segment 10 is introduced into the right end of frame 16 and screw 18 is rotated, the ends of the band will be interconnected, and the band can be drawn up tightly about a hose.

Intermediate segment 14 is provided with a plurality of sets of transverse slots 22 spaced along the intermediate segment in the direction of length thereof and with slots 22 being arranged in pairs also spaced in the direction of the length of the intermediate segment 14. Interposed between each pair of transverse slots 22 are longitudinal slots 24. The strip of material illustrated in FIG. 2 can be severed at any point therealong between adjacent pairs of transverse slots 22, as indicated by the dot-dash line 26 to provide an intermediate segment of any desired or necessary length.

The strip of material shown in FIG. 2 is embossed upwardly out of the plan of the strip in the region thereof falling between each adjacent pair of slots 22 and including the longitudinal slots 24. The raised central region of the strip of material disposed between each adjacent pair of transverse slots 22 is indicated at 28.

FIG. 3 shows terminal segment 12 and, at the end opposite the end on which frame 16 is mounted, segment 12 carries a tongue 30 projecting therefrom and narrower than the remainder of the segment 12. Tongue 30 terminates at its free end in a hook 32 and along the sides has upstanding tabs 34.

The region of terminal portion 12 commencing near the base end of tongue 30 and extending a short distance along the band is embossed upwardly as indicated at 36. The tongue 30 including hook 32 and tabs 34 is adapted for being received in slots 22 and to this end it will be appreciated that slots 22 in the direction of the length of the band are wide enough to receive tongue 32 and at the ends of the slots 22 there may be notches to permit the passage therethrough of tabs 34.

FIG. 4 shows terminal segment 10 which will be seen also to comprise a tongue 30 with a hook 32 at the free end and with upstanding tabs 34 along the sides of the tongue. The segment 10 adjacent the base of the tongue is also embossed upwardly as indicated at 36 so that each of segments 12 and 10 are substantially identical commencing from the outer free end back to the end part of the embossed portion 36.

FIG. 5 shows a typical connection made between segments by means of the tongue and slots above described.

In FIG. 5, it will be noted that tongue 30 has been introduced endwise through the righthand one of slots 22 and that the hook 32 on the free end of the tongue has been engaged through the lefthand one of slots 22. Simultaneously with the engagement of hook 32 in the lefthand one of slots 22, the tabs 34 enter longitudinal slots 24 for locking the segments together and for assisting in transmitting tensile forces between the segments.

Advantageously, some pressure is required to snap tongue 32 into the lefthand slot 22 while simultaneously forcing tabs 32 into longitudinal slots 24 so that once the segments are snapped together they will not become disassembled.

FIG. 5 will also show that the embossed portion 28 of segment 14 together with the embossed portion 36 of the segments 10 or 12 connected thereto cooperate to provide for a substantially smooth contour on the radially inner side of the assembled segments so that the band when mounted on a hose will take a good bearing thereon about the entire periphery of the hose.

With regard to frame 16, an advantageous manner of forming this part of the hose clamp, and which construction can be employed with hose clamps of conventional type, is shown in FIGS. 7, 8 and 9. In FIG. 7, reference numeral 50 indicates the end of a hose clamp band which may be the end part of one of the segments of the previously described modification or the end part of a complete hose clamp band.

Disposed beneath the band is a saddle 52 that has an axially extending upwardly embossed central region 54 and upwardly turned side flanges 56. The saddle has notches 58 formed therein along the side edges for the purpose of receiving tabs formed on the housing part of the frame when the frame is assembled on the band.

The band is formed with longitudinally spaced incisions 60 which are spaced longitudinally the same distance as the length of the upwardly embossed central region 54 of the saddle and the band is embossed upwardly between the incisions as at 62. The described construction provides a pocket in the band opening upwardly into the bottom adapted to receive the upwardly embossed portion of saddle 52 for locating saddle 52 on the band and for positively locking it to the band against longitudinal movement thereon.

Above the band is a housing member 64 forming another part of the frame and which housing member is generally U-shaped in the central region to form a cavity for receiving the screw 66. Extending laterally from screw 66 are wing portions 68 having flanges 69 adapted to abut the upper edges of side flanges 56 of saddle 52. Housing member 64 also has formed thereon tabs 70 adapted for registration with notches or apertures 58 formed in the saddle. Housing member 64 is symmetrical about longitudinal and transverse axes for ease of assembly with the saddle.

It will be noted in FIG. 9 that the housing member has arcuate recesses 65 at the opposite ends to engage screw 66. Recesses 65 are both the same size and screw 66 has two regions of equal diameter to engage the recesses. The arrangement permits a larger thread for more complete engagement of the screw with the band and, therefore, a stronger band.

In assembling the arrangement shown in FIG. 7, the saddle is placed against the band from beneath and the housing member is placed on top of the band from above with tabs 70 dependent on opposite sides of the saddle member and tabs 70 are then clamped inwardly toward the center of the band thereby fixedly locking the saddle member and housing member together and to the band in fixed relation thereto.

The clamping tabs referred to could be formed on either one or the other or both of the saddle member and housing member and this manner of securing the housing member to the saddle member can also be availed of in connection with the more conventional manner of fixing the saddle to the band.

In FIG. 10, the saddle member 80 has tabs 88 at the opposite ends for engaging beneath lateral flanges 91 of housing member 92 to locate the saddle on the housing member. Saddle member 82 is provided with upstanding clinching tabs 90 at the side edges for bending over flanges 91 of the housing member.

Housing member 92 on the other hand is provided with dependent clinching tabs 96 along with side edges which, when the housing member is assembled on the saddle member, will be disposed between the clinching tabs 90. When housing member 92 is placed on the saddle member, with band 86 therebetween, and tabs 90 and 96 are clamped over the assembly will be firmly locked together.

The assembling of the housing member with the saddle member according to either of the modifications of FIGS. 7 or 10 is quite simple and can be effected automatically in suitable machinery thereby substantially eliminating time consuming and expensive hand operations.

In FIG. 5A, a connector strip 100 is illustrated which can be used to connect a pair of band segments together. In FIG. 5A, the connector strip at each end has a tongue 12a with side tabs 34a and an end hook 32a. Each tongue 12a, at the base end, is embossed as indicated at 36a.

Modifications may be made within the scope of the appended claims.

What is claimed is:

1. In a hose clamp; a band adapted to be placed in surrounding relation to a hose to be clamped, cooperating elements of a releasable connection means on the free ends of said band for holding the band on the hose in clamping relation thereto, said band comprising a plurality of circumferential segments in end to end relation, end forming pairs of adjacent ends along the band, a tongue projecting from one of the ends of each pair of adjacent ends of said segments and terminating in a hook, and a set of transverse slots in the other of the ends of each pair of adjacent ends of said segments and spaced in the direction of the length of said band, said tongue being insertable in the one of said transverse slots nearest the extreme end of the respective segment from one side of the respective segment and said hook being receivable in the other of said slots from the other side of the respective segment, each slot and the said tongue being more narrow than said band and being centrally located with respect to the width of the band.

2. A hose clamp according to claim 1 which includes longitudinal slots disposed axially between said spaced transverse slots and spaced in the lateral direction of said band a distance about equal to the width of said tongue, and said tongue including tabs upstanding from the side edges thereof and receivable in said longitudinal slots when said hook is engaged with the respective transverse slot.

3. A hose clamp according to claim 1 in which each pair of adjacent ends are embossed in such a manner that when the said segments are assembled the band presents a substantially smooth internal surface to the hose being clamped.

4. A hose clamp according to claim 1 in which said segments comprise a pair of terminal segments and an intermediate segment, each said terminal segment having one element of said releasable connection means on one end thereof and a said tongue on the other end thereof, said intermediate segment comprising at least two sets of said transverse slots spaced thereon in the direction of the length of said band.

5. A hose clamp according to claim 4 in which one of said elements of a releasable connection means comprises frame means fixed to the said one end of the respective terminal segment and a screw extending lengthwise of the band and captive in the frame means, the said one end of the other terminal segment being receivable endwise into said frame means and having threads distributed lengthwise of the band engageable by said screw.

6. A hose clamp according to claim 5 in which said frame means comprises a saddle member on one side of said one end of said terminal segment and a U-shaped housing member on the other side, said screw being captive in said housing member, and at least one of said saddle member and housing member comprising marginal tabs clinched about the margin of the other thereof.

7. A hose clamp according to claim 6 in which the laterally central region of said saddle member is embossed toward said housing member, said terminal segment having incisions thereon at the ends of said embossed central region of said saddle member and being embossed toward said housing member between the incisions to receive the embossed region of said saddle member.

8. A hose clamp according to claim 6 in which said housing member and saddle member comprise cooperating elements of abutment means thereon interengageable to provide for the gap therebetween to receive said band.

9. A hose clamp according to claim 6 in which said housing member is symmetrical about longitudinal and transverse central axes.

* * * * *